3,299,027
PURIFICATION OF POLYOLEFINS
Luciano Luciani and Piero Manaresi, Ferrara, Italy, assignors to Montecatini Edision S.p.A., Milan, Italy
No Drawing. Filed June 24, 1963, Ser. No. 290,178
Claims priority, application Italy, June 27, 1962, 12,875/62
11 Claims. (Cl. 260—93.7)

The present invention relates to a process for the purification of polyolefins. More particularly, the present invention relates to a process for the purification of polyolefins obtained with the aid of stereospecific catalysts obtained from a transition metal halide and an organometallic compound.

Solid polymers of ethylene, propylene and other alpha-olefins, which polymers are characterized by a linear, regular structure, and which generally also show a high crystallinity, are generally obtained by means of catalytic systems which can act at low pressures. Such catalytic systems are called stereospecific or "coordinate" catalysts and are the reaction products of an organometallic compound with a transition metal compound.

Higher stereospecificity is generally obtained by using catalytic systems which are the reaction products of an organometallic compound of aluminum of the type $AlR_nX_{3-n}$ (wherein R is either an alkyl, aryl or cycloaliphatic group, X is either a halogen, R, or an OR group, and $n$ is an integer from 1 to 3) with a solid crystalline halide of titanium of vanadium in a valence state lower than its maximum, which lower valent halide may be obtained by the reduction of a tetrahalide with hydrogen, aluminum and/or titanium or with an organoaluminum compound. Typical of the $AlR_nX_{3-n}$ compounds are $Al(C_2H_5)_3$, $Al(C_4H_9)_3$, $Al(C_2H_5)_2Cl$, $Al(C_2H_5)Cl_2$, $Al(C_3H_7)_3$, $Al(C_6H_{13})_3$, $Al(C_8H_{17})_3$, $AlH(C_2H_5)_2$, $Al(iso\ C_4H_9)_2H$, etc.

It is known that the presence of even small amounts of residues of the metal compounds comprising the foregoing catalysts in the finished polymers leads to many inconveniences, e.g. as regards adversely affecting the heat stability of the polymer.

Many methods have heretofore been proposed for eliminating or reducing to a minimum the amount of catalytic residue in the finished polymer, and particularly for reducing the residue of titanium compounds, for such residues appear to exert a more unfavorable effect on the stability of the polymer. Thus, treatments have been proposed wherein there are employed aqueous or preferably alcoholic washing agents containing basic or acid compounds, or suitable specified agents capable of reacting with the metals of the catalytic systems to produce complexes.

Generally, treatment in alkaline medium is preferred because such treatment neutralizes the acidity resulting from the decomposition of the catalyst components, which acidity otherwise causes corrosion phenomena in the apparatus and therefore makes possible a further adulteration of the polymer or else requires expensive anti-corrosion equipment. Thus, there has been proposed the use of an alcoholic solution of alkaline alcoholates for the purification of crude polyolefins. Such a purifying solution is, however, not very effective in that it acts rather slowly in eliminating the catalytic residues which contain titanium in a reduced form.

We have now surprisingly found that the addition of a small amount or an organic compound (A) selected from the group consisting of aromatic nitroderivatives and quinones to the alkaline alcoholic solution further reduces the content of the catalytic residues (e.g., containing titanium) in the finished polymer, and thus substantially improves the stability of the polymer to oxidative and weather agents, heat, light, etc.

The alkaline alcoholic solutions to be used in accordance with the present invention comprise an aliphatic alcohol having from 1 to 10 carbon atoms containing dissolved therein an alkaline hydroxide or an alkaline alcoholate, the latter being obtained, for instance, by a reaction between the alcohol and free alkali metal or from other alkali metal compounds which react basically. The concentration of the alkaline compound dissolved in the alcoholic solution must be such as to assure a pH of the medium greater than 10 during the washing treatment.

The amount of the organic compound (A) to be used in accordance with the present invention is from about 0.1 to 5% by weight based on the crude polymer, and preferably is from about 0.5 to 1.5% by weight.

Suitable aromatic nitroderivatives include nitrobenzene, m-dinitrobenzene, o-dinitrobenzene, p-dinitrobenzene, nitrophenylhydrazines, dinitrophenylhydrazines, etc.

Quinones which can be used in accordance with the present invention include p-benzoquinone, naphthoquinone, anthraquinone, and their derivatives.

Polyolefins purified by the process of the present invention, because of their low ash content, are particularly suitable for use in the formation of fibers, films and other manufactured articles. The process of the present invention will be further illustrated by the following examples. All parts are by weight unless otherwise indicated.

EXAMPLE 1

1 kg. of polypropylene obtained by polymerization in heptane solution and still containing the polymerization catalyst (diethylaluminummonochloride and titanium trichloride) is treated, after centrifuging, while agitating and under pure nitrogen, with about 3 liters of methanol containing 6.5 g./l. of sodium methylate and 6 g. of nitrobenzene at a temperature of about 60° C., for 2 hours. The methanol is siphoned off and the residue is washed again three times using only methanol at 60° C. for 45 minutes (always under pure nitrogen), using a total amount of 8 liters of alcohol. Finally, the methanol is siphoned off and the product is dried. The ash content is determined and found to be equal to 0.04%; the titanium content with respect to the polymer is 100 parts per million, and the aluminum content is 60 p.p.m. By comparison, when the polymer is purified using the same procedure but in the absence of nitrobenzene, the ash content is 0.08%, the titanium content is 225 p.p.m., and the aluminum content is 60 p.p.m. The polymer as such (not purified) had an ash content equal to 0.15%, a titanium content of 265 p.p.m., and an aluminum content equal to 450 p.p.m.

EXAMPLE 2

1 kg. of polypropylene (starting material of Example 1, obtained by polymerization in heptane solution and still containing the catalyst) is purified, after centrifuging, as described in Example 1, but using m-dinitrobenzene instead of nitrobenzene. The dried polymer shows an ash content of 0.04%; the titanium content is 110 p.p.m.; the aluminum content is 35 p.p.m.

EXAMPLE 3

The procedure described in Example 1 is repeated, but using 2,4-dinitrophenylhydrazine instead of nitrobenzene. The ash content is 0.05%; the titanium content is 150 p.p.m.; the aluminum content is 45 p.p.m.

EXAMPLE 4

The procedure of Example 1 is followed, but using anthraquinone instead of nitrobenzene. The ash content is 0.04%; the titanium content is 110 p.p.m.; the aluminum content is 60 p.p.m.

EXAMPLE 5

The reaction product of 0.7 g. of diethylaluminum-monochloride and 0.3 g. titanium trichloride in 20 cc. of technical heptane, previously mixed, is introduced into 500 cc. of anhydrous methanol (100 p.p.m. $H_2O$) from which dissolved air has been removed, the methanol containing dissolved therein 3 g. of sodium methylate, the entire mixture being kept under pure nitrogen.

Immediately there appears a brown precipitate. The mixture is kept under agitation for a few hours at a temperature of 60° C. The initial precipitate persists and under these conditions is only sparingly soluble and does not give a clear solution. By working as described above, but adding 0.5 g. of nitrobenzene together with sodium methylate to the methanol, as soon as the catalyst is introduced it dissolves instantaneously and a wholly clear, colorless solution is obtained.

EXAMPLE 6

The product (in the form of a violet suspension) obtained by reacting under pure nitrogen in 60 cc. of anhydrous heptane 0.7 g. of triethylaluminum and 0.3 g. of $TiCl_3$ (obtained by reducing $TiCl_4$ with hydrogen at high temperature) is heated to 60° C. To this suspension are introduced 500 cc. of de-aerated methanol, which had previously been heated to 60° C., and alkalinized with sodium methylate, the methanol containing 0.5 cc. of nitrobenzene. After some time the complete dissolution of the catalyst is observed. In the absence of nitrobenzene, the alkaline alcoholic solution is not able to dissolve the catalytic suspension.

Variations can of course be made without departing from the spirit of our invention.

Having thus described the invention, what is desired to be secured and claimed by Letters Patent is:

1. In a method of purifying a polyolefin obtained with the aid of stereospecific catalysts made from a transition metal halide and an organometallic compound, said method comprising treating said polyolefin with an alkaline alcoholic solution, the improvement comprising incorporating in said solution an organic compound selected from the group consisting of aromatic nitro compounds and quinones.

2. The method of claim 1, wherein the amount of organic compound added to the alkaline alcoholic solution is from about 0.1 to 5% by weight of the crude polyolefin.

3. The method of claim 2 wherein the amount of organic compound added is from about 0.5 to 1.5% by weight of the crude polyolefin.

4. The method of claim 1 wherein said organic compound is nitrobenzene.

5. The method of claim 1 wherein said organic compound is m-dinitrobenzene.

6. The method of claim 1 wherein said organic compound is 2,4-dinitrophenylhydrazine.

7. The method of claim 1 wherein said organic compound is anthraquinone.

8. The method of claim 1 wherein the alkaline alcoholic solution is a solution consisting of an aliphatic alcohol containing from 1 to 10 carbon atoms containing dissolved therein a basic alkaline compound selected from the group consisting of alkaline metal hydroxides and alkaline metal alcoholates.

9. The method of claim 8 wherein the concentration of the basic alkaline compound in the alcoholic solution is such as to maintain the pH of the medium during the washing treatment greater than 10.

10. The method of claim 8 wherein the alkaline alcoholic solution is methanol with sodium methylate dissolved therein and the purification treatment is carried out at a temperature of about 60° C.

11. The method of claim 1 wherein the stereospecific catalyst consists of the reaction product of diethylaluminummonochloride and titanium trichloride.

References Cited by the Examiner
UNITED STATES PATENTS

| | | | |
|---|---|---|---|
| 3,098,845 | 7/1963 | Cull et al. | 260—94.9 |
| 3,186,978 | 6/1965 | Caldo et al. | 260—94.9 |

JOSEPH L. SCHOFER, *Primary Examiner.*

L. EDELMAN, *Assistant Examiner.*